UNITED STATES PATENT OFFICE 2,491,658

GUANAMINES

William F. Gresham, Wilmington, Del., assignor to E. I. du Pont de Nemours & Company, Wilmington, Del., a corporation of Delaware No Drawing. Application November 23, 1943, Serial No 511,476

12 Claims. (Cl. 260—249.5)

This invention relates to heterocyclic nitrogen compounds, and particularly to new compositions of matter which may be represented by the formula

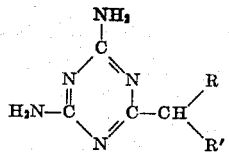

in which R is an alkoxy or an alkoxyalkoxy group and R' is either hydrogen or an alkyl group. This invention also relates to a method for preparing such compositions.

An object of this invention is to provide new and useful triazine derivatives. Another object is to provide a process for the preparation of 4,6-diamino-1,3,5-triazines with substituents in the 2-position. Still another object is to prepare 4,6 - diamino - 1,3,5 - triazines containing alkoxyalkyl or alkoxyalkoxyalkyl substituents in the 2-position. A still further object is to prepare substituted diaminotriazines which have good resinforming properties when treated with formaldehyde or with urea-formaldehyde condensation products.

These and other objects are accomplished in accordance with this invention by reaction between dicyandiamide and compounds of the formula RCHR'CN wherein R is an alkoxy or an alkoxyalkoxy group and R' is a member of the class consisting of hydrogen and alkyl groups. Certain of the reactants included by the formula RCHR'CN may be prepared in accordance with a procedure described in copending application of D. J. Loder and W. M. Bruner, S. N. 430,994, filed February 14, 1942, now Patent 2,398,757, issued April 16, 1946.

Among the alkoxy and alkoxyalkoxy nitriles which may react with dicyandiamide in accordance with this invention are methoxymethoxyacetonitrile, methoxyacetonitrile, isobutoxyacetonitrile, tertiary - butoxyacetonitrile, ethoxymethoxyacetonitrile, alpha-methoxypropionitrile, alpha - methoxyisobutyronitrile, alpha - ethoxymethoxypropionitrile, and the like. In general these reactants are nitriles in which an alkoxy or an alkoxyalkoxy group is attached to the carbon atom which is adjacent to the nitrile group.

The alkoxyalkyl and alkoxyalkoxyalkyl diaminotriazines prepared in accordance with this invention condense readily with formaldehyde or with reactive urea-formaldehyde condensation products, such as dimethylol urea, particularly in the presence of acid-reacting catalysts or with catalysts which yield acid when heated. The resinous products which may be thus prepared are suitable for the manufacture of molded articles, impregnated paper, impregnated wood, coatings, electrical insulation and adhesives. They are particularly valuable in the manufacture of plywood adhesives having good resistance to both cold and hot water.

The reaction between dicyandiamide and the alpha-alkoxy or alpha-alkoxyalkoxy nitriles takes place with considerable ease, and the desired 4,6-diamino - 1,3,5 - triazines having alkoxyalkyl or alkoxyalkoxyalkyl substitutents in the 2-position are obtained in good yields. Alkaline-reacting materials, preferably amines, are effective as catalysts for the reaction. For example, an excellent catalyst is piperidine. This invention, in one of its embodiments, contemplates heating dicyandiamide with an alpha-alkoxy or alpha-alkoxyalkoxy nitrile in the presence of a catalytic amount of an alkaline-reacting material, such as piperidine, in a closed vessel at a temperature in the range 150° C. to 200° C. for about 15 minutes or longer, thereafter cooling the mixture to room temperature whereby a slurry is produced from which the crystalline triazine derivative can be isolated in substantially pure form by simple filtration. The product can be purified by recrystallization from a solvent, such as water.

In the preparation of the 4,6-diamino-1,3,5-triazine derivatives in accordance with this invention, good yields are obtained when equimolal amounts of dicyandiamide and alpha-alkoxy or alpha-alkoxyalkoxy nitriles are used as reactants. However, certain advantages are realized when the nitrile is present initially in excess. Thus, if about two moles of the nitrile are charged into the reaction vessel per mole of dicyandiamide, and the reaction is conducted as above described, a product is obtained which, when cooled to room temperature, yields a slurry which can be handled conveniently in a subsequent filtration operation.

The amount of catalyst which may be used in accordance with this invention is not critical although a convenient amount is in the range of about 0.01 to 0.2 mole per mole of dicyandiamide initially present. It is quite possible to use larger amounts of catalyst, or even to use the catalyst in such quantity that it may be considered to be the reaction medium.

The reaction between the alpha-alkoxy or alpha-alkoxyalkoxy nitriles and dicyandiamide is sufficiently rapid at 150° to 200° C. that a reaction time of only about 15 minutes is frequently sufficient for conversions exceeding 85%. At lower temperatures the reaction proceeds more slowly.

This invention is particularly valuable in the preparation of the diaminotriazine derivatives from dicyandiamide and substituted nitriles of relatively low molecular weight, i. e. those nitriles represented by RCHR'CN wherein R is an alkoxy or an alkoxyalkoxy group (the alkoxy having in each instance 1 to 4 carbon atoms, inclusive), and R' is either hydrogen or an alkyl group having to 1 to 3 carbon atoms, inclusive. However, the reaction is a general one, which is useful in the preparation of numerous 4,6-diamino-1,3,5-triazines (having alkoxyalkyl or alkoxyalkoxyalkyl substituents in the 2-position of the triazine ring) from alpha-alkoxy or alpha-alkoxyalkoxy nitriles and dicyandiamide.

*Example 1.—4,6-diamino-2-(ethoxymethoxy) methyl-1,3,5-triazine*

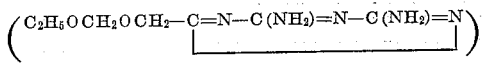

A charge consisting of 42 grams of dicyandiamide, 230 grams of (ethoxymethoxy)acetonitrile and 8.1 grams of piperidine catalyst was processed for 15 minutes under atmospheric pressure at 160–172° C. The triazine was obtained in fairly pure condition simply by filtering the reaction mixture after it had cooled to room temperature. The conversion based on dicyandiamide was 86%; yield based on the nitrile was nearly quantitative. The triazine crystallizes from water as bright needles, M. P. 177.5–178.5° C.

*Example 2.—4,6-diamino-2-(isobutoxymethoxy) methyl-1,3,5-triazine*

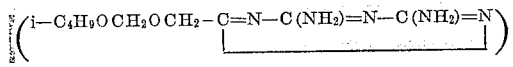

A mixture consisting of 133 grams of (isobutoxymethoxyacetonitrile), 13.2 grams of dicyandiamide and 4.4 grams of piperidine catalyst was stirred and heated at 170–184° C. for 1.5 hours under atmospheric pressure. The reaction mixture was filtered when cool and the crude triazine was purified by crystallization from a mixture of water and dioxane (2:1), M. P. 175.0–178.5° C. The yield of purified product based on dicyandiamide was 67%.

*Example 3.—4,6-diamino-2-tertiarybutoxymethyl-1,3,5-triazine*

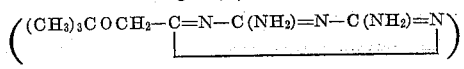

A charge composed of 163 grams of t-butoxyacetonitrile, 20.2 grams of dicyandiamide, and 5.5 grams of piperidine catalyst was processed 5.5 hours at 165–178° C. under atmospheric pressure. Filtration of the reaction mixture when cool gave 39.5 grams of the crude triazine; yield, based on dicyandiamide, was 83.5%. This triazine crystallizes from water as needles which decompose at 236–237° C.

The reaction between dicyandiamide and the alpha-alkoxy or alpha-alkoxyalkoxy nitriles may be carried out in any suitable pressure-resisting vessel such as an autoclave made of or lined with stainless steel, silver, glass or the like. The process may be operated in a continuous manner if desired.

Having thus described my invention, I claim:

1. A process for preparing a substituted triazine of the formula

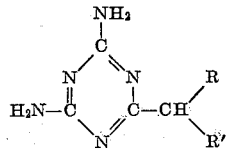

by reaction between dicyandiamide and a compound of the formula RCHR'CN, R being an alkoxyalkoxy group, and R' being a member of the class consisting of hydrogen and alkyl groups.

2. A process for preparing a substituted triazine of the formula

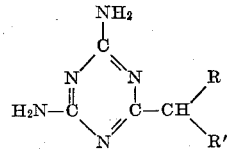

by heating dicyandiamide in the presence of an alkaline-reacting catalyst with a nitrile having the formula RCHR'CN, R being an alkoxyalkoxy group, and R' being a member of the class consisting of hydrogen and alkyl groups.

3. A process for preparing compounds of the formula

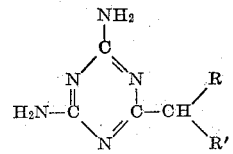

wherein R is an alkoxyalkoxy group, the alkoxy having in each instance 1 to 4 carbon atoms inclusive, and R' is a member of the class consisting of hydrogen and alkyl groups containing 1 to 3 carbon atoms which comprises heating dicyandiamide at 150° to 200° C. with a nitrile having the formula RCHR'CN wherein R is an alkoxyalkoxy group, the alkoxy group of which has in each instance 1 to 4 carbon atoms, inclusive, and R' is a member of the class of hydrogen and alkyl groups having 1 to 3 carbon atoms, inclusive in the presence of an alkaline reacting catalyst.

4. A process for preparing 4,6-diamino-2-(ethoxymethoxy) methyl-1,3,5-triazine which comprises heating dicyandiamide with (ethoxymethoxy) acetonitrile in the presence of an alkaline catalyst at a temperature within the range of about 150° to 200° C., and separating crystalline 4,6-diamino-2-(ethoxymethoxy) methyl-1,3,5-triazine from the product.

5. A process for preparing 4,6-diamino-2-(isobutoxymethoxy) methyl-1,3,5-triazine which comprises heating dicyandiamide with (isobutoxymethoxy) acetonitrile in the presence of an alkaline catalyst at a temperature within the range of about 150° to 200° C. and separating crystalline 4,6-diamino-2-(isobutoxymethoxy) methyl-1,3,5-triazine from the product.

6. A process for preparing a substituted triazine of the formula

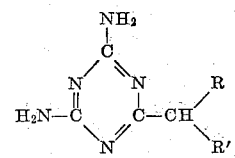

by heating dicyandiamide in the presence of an alkaline-reacting catalyst at a temperature in the range of 150° to 200° C. with a nitrile having the formula RCHR'CN, R being an alkoxyalkoxy group, and R' being a member of the class consisting of hydrogen and alkyl groups.

7. The process of claim 2 wherein the nitrile is initially present in excess of the theoretically required quantity.

8. The process of claim 2, wherein the alkaline-reacting catalyst is piperidine.

9. Compounds of the formula

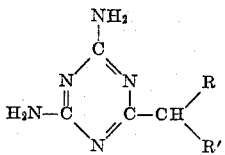

in which R is an alkoxyalkoxy group, and R' is a member of the class of hydrogen and alkyl groups.

10. Compounds of the formula

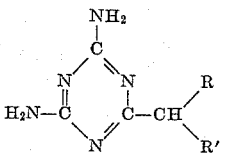

wherein R is an alkoxymethoxy group, the alkoxy having in each instance 1 to 4 carbon atoms, inclusive, and R' is a member of the class consisting of hydrogen and alkyl groups containing 1 to 3 carbon atoms inclusive.

11. 4,6 - diamino-2-(ethoxymethoxy) methyl-1,3,5-triazine having the structural formula:

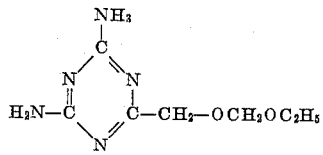

12. 4,6-diamino-2-(isobutoxymethoxy) methyl-1,3,5-triazine having the structural formula.

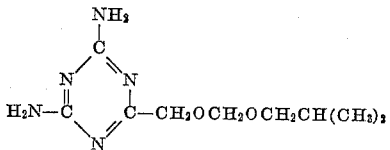

WILLIAM F. GRESHAM.

REFERENCES CITED

The following references are of record in the file of this patent:

UNITED STATES PATENTS

| Number | Name | Date |
|---|---|---|
| 2,302,162 | Zerweck | Nov. 17, 1942 |
| 2,309,681 | Thurston | Feb. 2, 1943 |
| 2,309,680 | Thurston | Feb. 2, 1943 |
| 2,309,624 | Bradley | Feb. 2, 1943 |
| 2,398,757 | Loder | Apr. 16, 1946 |
| 2,437,691 | Grun | Mar. 16, 1948 |

FOREIGN PATENTS

| Number | Country | Date |
|---|---|---|
| 540,651 | Great Britain | Oct. 24, 1941 |